United States Patent [19]

Miksic et al.

[11] 4,051,066

[45] Sept. 27, 1977

[54] CORROSION-INHIBITING RUBBER AND METHODS OF PREPARATION

[75] Inventors: Boris A. Miksic, Oakdale; Donovan P. Stern, Staples, both of Minn.

[73] Assignee: Northern Instruments Corporation, Lino Lakes, Minn.

[21] Appl. No.: 540,565

[22] Filed: Jan. 13, 1975

[51] Int. Cl.² .......................... C23F 11/14; C23F 11/18
[52] U.S. Cl. .............................. 252/389 R; 21/2.5 R; 21/2.7 R; 106/14; 148/6; 252/392; 427/216; 427/221
[58] Field of Search .......................... 252/392, 389 R; 21/2.5 R, 2.5 B, 2.7 R; 106/14; 148/6; 427/216, 221

[56] References Cited

U.S. PATENT DOCUMENTS

| | | | |
|---|---|---|---|
| 2,914,377 | 11/1959 | Bull | 21/2.5 R |
| 3,642,998 | 2/1972 | Jennings | 21/2.5 B |
| 3,836,077 | 9/1974 | Skildum | 21/2.5 B |

*Primary Examiner*—Benjamin R. Padgett
*Assistant Examiner*—Irwin Gluck
*Attorney, Agent, or Firm*—Thomas M. Meshbesher

[57] ABSTRACT

The disclosed corrosion-inhibiting elastomers are typically made by milling the corrosion inhibitor into a solid rubber matrix. Preferred corrosion inhibitors include the aromatic carboxylates of primary, secondary or tertiary amines. Chromates and 2-ethylhexanoates can also be used. Organic ammonium nitrites are effective against some types of corrosion, but should be used with relatively inert elastomers. There appears to be synergistic cooperation between the elastomeric molecular structure and the corrosion inhibitor resulting in unusually effective protection of ferrous and/or nonferrous metals adjacent to rubber parts made from the corrosion-inhibiting elastomer.

20 Claims, No Drawings

CORROSION-INHIBITING RUBBER AND METHODS OF PREPARATION

FIELD OF THE INVENTION

This invention relates to corrosion inhibition. An aspect of this invention relates to the inhibition of corrosion in ferrous and non-ferrous metals. Another aspect of this invention relates to a cellular or (preferably) non-cellular elastomer which contains a corrosion-inhibiting additive which imparts corrosion-inhibiting properties to the elastomer. Still another aspect of this invention relates to a method for making a corrosion-inhibiting elastomer.

DESCRIPTION OF THE PRIOR ART

Both natural and synthetic elastomers or rubbers typically are capable of producing an accelerating effect upon corrosion or chemical degradation at normal ambient conditions and particularly under elevated temperature conditions. Oxidizing agents or the like released from the elastomer (e.g. sulfur or sulfur compounds, cyano compounds, chlorine or chlorine compounds, etc.) can attack materials such as plastics and are particularly likely to have a corrosion-accelerating effect with respect to ferrous and some non-ferrous metals. It is presently believed that sulfur or sulfur compounds (e.g. used in compounding or vulcanizing the elastomer) and/or corrosive agents derived from functional groups on synthetic elastomeric materials are responsible for initiating or accelerating the corrosion. Thus, in a mechanical apparatus containing metal parts and rubber parts (e.g. rubber seals, gaskets, O-rings, etc.), the metal parts of the apparatus can become severly corroded due to the proximity of the rubber or elastomer. The problem can be very serious in an apparatus such as an internal combustion engine or other heat engine which operates at high internal temperatures. Another condition which appears to aggravate the problem is the proximity of corrosive fluids such as sea water or salt spray or biological fluids which can support molds, bacterial cultures or the like. For example, corrosion inhibition can be extremely important with respect to metallic hearing aid parts.

Rubber coatings (permanent or strippable) have actually been used to protect metal against corrosion, but frequently with indifferent results. The theory behind using the rubber coating is that the rubber can prevent moisture, salt water, oxygen, molds, and other corrosion-initiating or corrosion-accelerating materials or conditions from reaching the metal surface. It has been found that the rubber should be carefully selected, so that it too will not play a part in the corrosion process. It has also been found that the thickness and oxygen-permeability properties of the rubber coating should be carefully controlled to achieve the desired result.

There are several classes of chemical compounds which are known to inhibit corrosion, at least for ferrous metals. Among these are the carboxylic acids, the amines, benzoate salts, volatile nitrites, and the like. These compounds inhibit corrosion by a variety of mechanisms including vapor phase inhibition and contact inhibition. In one approach to corrosion inhibition, an alkali metal benzoate or a benzoate of ammonium, zinc, aluminum, lead, or nickel, in concentrated aqueous solution, is blended with an aqueous rubber latex, so that a rubber film can be formed on the surface of a metal substrate. See Stroud et al, J. Appl. Chem., 2, pages 173 - 177 (1952). An interesting observation made by Stroud et al is that a raw 60% latex containing inhibitor produced a tacky film. The tacky film was eliminated through the use of a vulcanized latex. It was also observed that, if the content of chloride in the latex exceeds 0.1% on the weight of dry rubber, even a mixed benzoate-nitrite inhibitor is not very effective. Furthermore, it has been observed in other contexts that it is difficult to obtain protection against both cathodic and anodic corresive attack by simple mixture of inhibitors and that such mixtures (or even single component corrosion inhibitors) can adversely affect the physical properties of some rubbers and plastics.

Another approach to corrosion inhibition involves the use of a reservoir of volatile corrosion inhibitors, whereby corrosion is inhibited by essentially a vapor phase process. The volatility of the corrosion inhibitor or mixture of inhibitors can be selected to provide a room temperature vapor pressure ranging from, for example, $2 \times 10^{-5}$ to more than $3 \times 10^{-3}$ millimeters of mercury. The reservoir for the vapor phase inhibitor typically comprises a porous or open-cell of material such as foam rubber, kraft paper, cloth, paper board, felt, or sponge, all of which can be impregnated or coated with the inhibitor material. The resulting coated or impregnated article can be wrapped around, inserted in, or placed in proximity to the metal surfaces which need corrosion protection. The reservoir can serve some other function besides corrosion inhibitor, e.g. it can provide a sponge-like cushion at the bottom of a tool box. More often than not, however, the sole function of the reservoir is to provide a dispenser for corrosion-inhibiting vapor which deposits on and protects adjacent or remote metal surfaces.

As representative of the prior art, see the following U.S. patents:

| U.S. Pat. | Patentee | Date |
|---|---|---|
| 2,577,219 | Wachter et al | December 4, 1951 |
| 2,643,176 | Wachter et al | June 23, 1953 |
| 2,914,377 | Bull | November 24, 1959 |
| 3,642,998 | Jennings | February 15, 1972 |
| 3,836,077 | Skildum | September 17, 1974 |

See also British Patent Nos. 652,892 and 598,154 and see also the following reports of the Soviet Academy of Science (Akademia Nauk USSR):

Rozenfeld, I. L.: Corrosion and Protection of Metals, Institute of Physical Chemistry, Moscow, 1970, pages 140 - 146.

Rozenfeld, I. L.: Protection of Metals, Vol. 7, No. 4, Moscow, 1971, pages 392 - 400.

The above-mentioned reports of the Soviet Academy of Science contain some of the latest findings regarding benzoate-type corrosion inhibitors.

SUMMARY OF THE INVENTION

It has now been discovered that an elastomer can be transformed from a corrosion-accelerating or corrosion-initiating material to a corrosion-inhibiting material through the incorporation into the elastomer of certain types of corrosion inhibitors, resulting in an elastomeric composition with substantially the same mechanical, thermal, and electrical properties as the corresponding inhibitor-free material. That is, the corrosion inhibitor is distributed throughout the rubbery material itself without affecting important properties such as Shore hardness, tensile strength, elastic and flexural moduli, elongated at break, compression set and cold-flow resistance, lubricity, thermal stability, dielectric strength, and the like. Furthermore, the surface properties of treated elastomers of this invention can be, if desired, relatively free of surface tack and other adhesive effects. The corrosion-inhibiting property of a treated elastomer of this invention is surprisingly stable and has a surprisingly broad spectrum of effectiveness. Under both normal ambient and elevated temperature conditions, the life of the corrosion-inhibiting effect can be co-extensive with the life of an elastomeric part or article made from a corrosion-inhibiting elastomer of this invention. The inhibiting effect is observed in a wide variety of corrosive environments and the corrosion-inhibiting elastomer can have temperature stability comparable with elastomers of the highest temperature resistance. The corrosion inhibition does not appear to be limited to ferrous metals, nor does it appear to be limited to any specific type of corrosion. For example, inhibition has been observed with respect to galvanic coupling, uniform corrosion, localized attack and pitting, corrosion caused by fungal and biological growth, and special types of metallic corrosion such as stress corrosion cracking, corrosion fatigue, and, surprisingly, hydrogen embrittlement. The corrosion-inhibiting elastomer has also been found to be at least as suitable for molding and shaping processes as the corresponding untreated elastomer.

In some respects, a corrosion-inhibiting elastomer of this invention appears to be synergistic in its inhibiting effects. Many of the common rubbers or elastomers, as pointed out previously, tend to cause corrosion. Certain benzoates, on the other hand, are known to be effective in inhibiting corrosion. When an aromatic carboxylate of a primary, secondary, or tertiary amine is distributed through an elastomeric matrix in accordance with the teachings of this invention, the result is a corrosion-inhibiting elastomer which is generally more effective in inhibiting corrosion of metals than the aromatic carboxylate itself.

In this invention, the aromatic carboxylate of the amine need not be trapped in the interstices or pores of a cellular, porous, or sponge-like material. It is actually preferred that the corrosion-inhibiting elastomer be non-cellular with the aromatic carboxylate dissolved or (preferably) dispersed throughout a solid, non-cellular rubbery matrix. If desired, the elastomer can be blown or foamed to produce open or closed cells (e.g. to reduce density), but the pore-or cell-forming process need not have any relationship to the incorporation of the corrosion inhibitor in the elastomer. The preferred technique for incorporating the inhibitor into the elastomer typically involves milling of the elastomer with the usual rubber additives, one of the additives being a corrosion inhibitor selected according to this invention. Thus, the aromatic carboxylate can be milled into the elastomer as essentially dry particles or as a solute or dispersed phase in a conventional oily additive (e.g. an oil extender). It is not necessary that the corrosion inhibitor have a high volatility (i.e., a volatility in excess of, for example, 0.03mm or even 0.001mm of mercury at 21° C.). Relatively non-volatile corrosion inhibitors selected according to this invention are apparently carried to metal surfaces by other volatile materials eminating from the solid mass of elastomer. A number of particularly desirable long-term and short-term effects can be provided by selecting suitable mixtures of corrosion inhibitors with vapor pressures at room temperature ranging from less than $10^{-6}$ to more than $10^{-4}$mm of mercury.

DEFINITIONS

As used in this specification, certain technical terms have the following meanings.

"Elastomer" refers, of course, to rubbery polymers, both natural and synthetic. In this specification, the term "elastomer" should be construed in accordance with the A.S.T.M. definition (the American Society for Testing and Materials). Thus, an "elastomer" is a material which can be stretched at least 100% of its length, and which will return with force to substantially its original length when the tension is released.

The term "substantially anhydrous" is intended to exclude all but incidental or unintended amounts of water. That is, water acquired by hygroscopic effects or the like can be present, even though a material is "substantially anhydrous".

"Heterocyclo-aliphatic" refers to a cyclic compound or moiety which contains one or more hetero-atoms but is otherwise cycloaliphatic rather than aromatic. If at least one of the hetero-groups in the ring is NR (where R is hydrogen or a monovalent organic radical), the compound is referred to as a heterocycloaliphatic amine.

The term "distributed", as in the expression "distributed through an elastomeric matrix" is used herein to refer to a state of solid solution or dispersion, wherein the dispersed phase is in the form of extremely fine (e.g. colloidal) droplets or particles.

The term "milling" is intended to include any of the commonly used substantially anhydrous blending methods described hereinafter.

DETAILED DESCRIPTION

As pointed out previously, the combination of a solid rubber with corrosion inhibitor dispersed or dissolved in it appears to be more effective in inhibiting corrosion than the inhibitor compounds per se, even though the elastomers used in this invention, for the most part, have a corrosion-accelerating rather than a corrosion-inhibiting effect. Although this invention is not bound by any theory, some possible explanations for the observed synergism have been developed.

First, under suitable environmental conditions (which can include elevated temperatures), the elastomer can produce or release gaseous degradation products or contaminants which serve as carrier gases for the corrosion inhibitor compounds. Accordingly, some corrosion inhibiting compounds selected according to the teachings of this invention have a room temperature vapor pressure of about $10^{-6}$mm of mercury or less and yet are carried to remote regions of an apparatus by these gaseous materials.

Second, it may be significant that aromatic carboxylate (e.g. benzoate) salts of amines selected according to the teachings of this invention are present in the elastomeric matrix in an essentially non-dissociated form. This form of the carboxylic acid salt of the amine can, for example, be represented by the formula

ArCOOHNR$_3$ wherein Ar is the aromatic moiety and R is hydrogen or an organic group, and the three R's can be the same or different.

In other words, it is presently believed that carboxylate anions and ammonium (i.e., protonated amine) cations are not available as such until the carboxylate-amine salt is brought into contact with and/or condensed upon the metallic surfaces where corrosion could take place. In this connection, there is theoretical support in the literature for the proposition that o-nitrobenzoate amine salts are less effective than the corresponding meta-nitro salts. According to the theory, the orthonitro salts ionize more easily than the meta isomers. Therefore, it is presently believed to be an advantage to distribute (i.e., disperse or dissolve) the substantially anhydrous aromatic carboxylate in a substantially anhydrous elastomer, since the elastomer is an organic solid with sufficient hydrophobic or oleophilic or lipophilic character to stabilize the non-ionized, non-dissociated state of the carboxylate-amine salt.

Third, in preferred embodiments of this invention, an effort has been made to select corrosion-inhibiting compounds which mimic the chemical and/or physical characteristics of conventional rubber additives such as accelerators, anti-oxidizing agents, mold release-facilitating agents and the like. For example, benzoate salts of heterocyclo-aliphatic amines such as cyclohexamethyleneimine are believed to have sufficient chemical similarity to the known rubber additive hexametylenetetramine to impart improved molding characteristics to the elastomeric matrix. Even simple benzoates are believed to facilitate molding and to improve the stability (e.g. temperature stability) of most elastomers.

Fourth, and perhaps most important, the process of this invention is believed to produce a composition in which elastomeric molecules are intimately commingled with the molecules or microscopic individual crystals (or other miniscule particles) of the corrosion inhibiting carboxylate-amine salts. As is generally known in the art of chemistry, both linear and cross-linked organic polymeric molecules have the ability to store energy. By analogy to mechanics, wherein a long spring can store potential energy in a form readily convertible to kinetic energy, the elastomeric molecules are believed to provide an energy reservoir. The storage of energy in these long-chain molecules could be relatively vast as compared to the storage capacity of a rigid crystalline lattice, e.g. the lattice of a salt. It is further believed that the carboxylate-amine salt compounds selected for use in this invention, rather than merely reaching the vapor state and escaping from the elastomeric matrix are, in this invention, propelled from the matrix with enormous energy, due to the transfer of stored energy from the elastomeric molecules to the amine salt. If this theory is correct, the amine salt may be almost bombarding the metallic surfaces rather than simply reaching them and condensing upon them. It should also follow, if the theory is correct, that extremely intimate contact between the amine salt and the elastomeric molecular chains is desirable. The preferred techniques for achieving this intimate contact will be described subsequently.

Broadly speaking, there appear to be at least four factors which can be controlled to regulate the rate of release of corrosion inhibitor from the elastomer and the energy that the corrosion inhibitor molecules will have upon being released:

a. the polymer chain length of the elastomer, b. the degree of crosslinking or thermoset character of the elastomer, or, conversely, the degree of openness (e.g. linearity and/or thermoplastic character) of the elastomeric molecular structure, c. the concentration of corrosion inhibitor in the corrosion-inhibiting elastomer, and d. the nature of the corrosion inhibitor itself, e.g. its vapor pressure under given temperature conditions.

The four factors also help to define the rate at which the uniformly distributed corrosion inhibitor diffuses from the interior of the elastomeric mass to the surface of the mass. It has been found that, provided the corrosion inhibitor is uniformly distributed throughout a non-cellular elastomeric matrix, at least as much control over diffusion rates and release rates can be obtained by controlling the first three factors as by the selection of the corrosion inhibitor itself.

The general observation with respect to factors (a), (b) and (c) is that the release rate of the corrosion inhibitor increases with increasing polymer chain length, increasing openness of elastomeric molecular structure, and increasing concentration of corrosion inhibitor.

THE PROCESS

The preferred process for making corrosion-inhibiting elastomers of this invention involves conventional rubber milling techniques. The milling of a rubber polymer is essentially a mastication process wherein the rubber is kneaded, sheared, rolled, squeezed, and/or stretched or the like. Milling is used to blend in various rubber additives such as accelerators, anti-oxidants, carbon black, extenders, fillers, and the like. A further purpose of milling (in some contexts) is to increase the percent of oil-soluble material in the rubber. For example, polychloroprene can be milled to make it somewhat more compatible with other organic materials. Unlike the milling of pigments or other generally brittle inorganic materials, milling of elastomers is ordinarily not intended to pulverize a large chunk of solid material. Perhaps a good analogy would be to compare milling of elastomers with the stirring of an extremely viscous liquid. Although the rheologies of elastomers and viscous liquids are radically different, the objectives in both milling and stirring are frequently similar: for example, the blending of a relatively small amount of additive into a large body of material.

It is not necessary to prepared a finished rubber article in the practice of this invention. For example, a particularly convenient practice is to prepare a masterbatch by milling a relatively large amount of the corrosion inhibitor additive (e.g. 5 – 30% based on the weight of the resulting masterbatch) into the solid elastomer. The resulting masterbatch can be used in essentially the same manner as color masterbatches are used. That is, an untreated rubber can be blended with a prescribed amount of masterbatch, thus avoiding the need for blending the additive directly into the final rubber product.

The aromatic carboxylate corrosion inhibitor can be milled into a solid rubber in a variety of forms. For example, the corrosion inhibiting compound can be in the form of tiny solid particles (e.g. a $-20$ or, more preferably, $-100$ Tyler mesh powder). Alternatively, if a liquid ingredient is to be milled into the rubber (e.g. a hydrocarbon oil, plasticizer, or the like), the corrosion inhibiting compound can be dispersed or dissolved in the liquid, resulting in a very effective distribution of the corrosion-inhibiting compound throughout the elastomeric matrix.

After the corrosion-inhibiting matrix of solid elastomer has been prepared, the matrix can be subjected to a variety of additional conventional processing techniques, e.g. molding or other shaping steps, foaming or blowing, and the like. Thus, if a cellular elastomer is made according to this invention, it can have either open or closed cells. Furthermore, it is not necessary for the cells to contain any of the corrosion inhibiting compound, since it is already distributed throughout the intercellular elastomeric matrix. On the other hand, if a high intensity "burst" of corrosion protection is desired, the cells or interstices of the cellular elastomer can be impregnated with a solution of a suitable corrosion inhibitor. When the initial burst of corrosion inhibitor is virtually exhausted, the slow but energetic transfer of relatively less volatile corrosion inhibitor from the intercellular matrix takes over the job of corrosion inhibition.

One preferred practice of this invention is to use a batch of corrosion-inhibiting elastomer of this invention to make O-rings, gaskets, valve seats (or other valve members), resilient stop members, hoses, couplings, and any other sealing members, housings, conduits, or mechanical moving parts which are conventionally made of natural or synthetic rubber. When the corrosion-inhibiting elastomer part or molded article of this invention is inserted into the apparatus (engine, transmission, coupling joint, or the like) in place of the conventional rubber part, the usuable life of the metal in the apparatus is ordinarily extended to a significant degree. The corrosion damage is reduced or eliminated in placed where it is frequently the most severe, e.g. in sealed connections of metallic parts. The corrosion-inhibiting elastomeric part can also be active in preventing special types of metallic corrosion such as stress corrosion cracking, hydrogen embrittlement, and corrosion fatigue. When corrosion-inhibiting elastomers of this invention are used in an electrical or electronic apparatus (e.g. as insulators), it has been found that the presence of the intimately distributed corrosion-inhibiting compound does not adversely affect electrical properties such as dielectric strength. In high temperature corrosive environments, the corrosion-inhibiting elastomers of this invention have been generally found to have temperature stability comparable with elastomers of the highest temperature resistance.

To illustrate: where a prior art elastomeric gasket in a coupling or joint between two unlike metals can facilitate galvanic corrosion, an elastomeric gasket of this invention generally has the opposite effect and can even prevent galvanic coupling.

Another preferred practice is to make the usual rubber hearing aid parts out of a corrosion-inhibiting elastomer of this invention. The outer ear contains moisture and other materials which can form corrosive electrolytes. Corrosion of metal or electronic parts and attack on rubber parts in the hearing aid device can be avoided or substantially reduced by means of this preferred practice.

Except in certain applications such as coating of metal ship hulls, it is ordinarily unnecessary for corrosion-inhibiting elastomeric part or article of this invention to completely cover metallic surface exposed to corrosive environments. When preferred corrosion-inhibiting compounds are used in the elastomeric matrix, it is ordinarily sufficient for the corrosion-inhibiting part or article to be in proximity to, in partial contact with, or in the same enclosed space with the corrosion-inhibiting elastomer.

In making masterbatches or molded articles or parts of corrosion-inhibiting elastomer according to the teachings of this invention, it is preferred to use techniques such as milling which do not require the presence of water. For example, it is not ordinarily preferred to make a molded article from an aqueous latex of elastomer. (A rubber or elastomer latex is a system in which an aqueous medium provides the continuous phase and tiny elastomeric particles, e.g. particles less than 100 microns and preferably less than 25 microns in size form the dispersed phase.) There are, of course, other blending processes which do not involve a latex or other aqueous system. Some elastomers have sufficiently linear character and thermoplasticity to be solvated or readily dispersed in common organic solvents such as hydrocarbons, ketones, chlorinated aliphatics, and the like. The resulting solution or fine dispersion of rubber permits compounding with corrosion inhibitors selected according to this invention. Another technique involves the use of non-aqueous dispersions, solutions, and other liquid systems which can be heat-treated, chemically processed, etc. to change the liquid system to a solid elastomer. Among these known elastomer-forming systems are the vinyl plastisols and various types of liquid or dissolved or dispersed prepolymers which can be "cured" (e.g. with active hydrogen-containing compounds) to form elastomers. The isocyanate-capped polyurethane prepolymers, for example, can be liquid even in concentrations up to 100% "solids" (0% solvent). The addition of curing agents such as polyols converts the prepolymer to a solid rubbery material which, through the selection of appropriate starting materials, can have almost any desired amount of either thermoplastic or thermoset character.

Rubber latex materials can be used in this invention for providing corrosion-inhibiting coatings on metal, as in the approach described by Stroud et al, J. Appl. Chem. 2, 173 (1952). However, as will be apparent from the foregoing disclosure, coating metal according to the teachings of this invention can be carried out with any suitable flowable system (e.g. a system with a viscosity of less than 1,000,000 centipoise at room temperature) and would preferably not involve an aqueous system such as a latex. The preferred coating technique involves building up a plurality of layers of decreasing corrosion inhibitor content. For example, the first layer or lamina (the one in direct adherent interfacial contact with the metal substrate) can contain up to 30% by weight of the corrosion inhibitor, while the second layer would contain a lower level of corrosion inhibitor, though still more than 0.05% by weight of the layer. If a third layer is used, it will contain a lower level of corrosion inhibitor than the second layer and need not contain any corrosion inhibitor at all. The same principle, of course, can be used with almost any convenient number of layers, whereby the outermost layer (the layer most remote from the metal substrate) is intended to contain the corrosion inhibiting vapors and hold them against the metal substrate. For example, if the multi-layer coating as used on the bottom of a ship hull, it could be wasteful to include any corrosion inhibitor in the outermost layer or layers, since the inhibitor in these layers could be lost to the environment, i.e., the constant flow-by of sea water.

| Compound | Temperature, °C | Vapor Pressure, mm Hg |
|---|---|---|
| Heptyl ammonium m-nitrobenzoate | 68 | 0.0001 |

Among the desirable properties of the benzoates (i.e., benzoic acid-amine complexes) are the following: compatibility with many organic substances, non-toxicity (including little or no tendency to engender contact dermititis), and fungicidal properties. In addition, the amine benzoates appear to have a high capacity to be absorbed by the metal surface and good passivating properties without raising the pH. The amine-benzoic acid complexes can be considered to be amphoteric.

From the standpoint of passivation and related suppression of electrochemical or galvanic corrosion effects, the benzoates of cyclohexamethyleneimine (CHMI) appear to have unusual advantages. Based upon studies reported in the scientific literature, it is reasonable to conclude that the CHMI group increases the hydrogen overpotential, thus inhibiting aqueous electrochemical exidation-reduction reactions.

According to some of the theories of ferrous metal corrosion, the reduction of protons to hydrogen gas is a rate-determining step in the corrosion process. The presence of oxygen depolarizes the system and accelerates the corrosion reactions. In the absence of oxygen, bacteria can perform a similar function within the pH range of 5.5 to 8.5. Dissolved salts can also have an accelerating effect upon the corrosion process. A goal of this invention is to provide aminecarboxylic acid complexes which prevent or reverse depolarization. Given this anti-depolarizing effect, the exclusion of oxygen from the corrosion-producing environment becomes generally unnecessary.

Corrosion-inhibiting elastomers of this invention are effective through a broad pH range (e.g. 3.5 – 11.5) and appear to be particularly effective in the range of 6 – 10, e.g. about 8. Corrosion inhibition has been obtained with respect to both ferrous metals and copper alloy. For example, the dezincification of brass and bronze can be inhibited with corrosion-inhibiting elastomers of this invention. This observation is believed to be extremely important. Inhibitors which protect ferrous metals are frequently ineffective or even harmful toward copper alloys and vice versa.

Corrosion inhibitors selected according to the teachings of this invention are effective in amounts ranging from 0.1 – 10% by weight of the resulting corrosion-inhibiting elastomer (i.e., about 0.1 – 11 parts by weight of corrosion inhibitor per 100 parts by weight of rubber). This range of inhibitor levels is particularly suitable for molded or shaped articles or parts for electrical, electronic, mechanical, or hydraulic devices or apparatus. As pointed out previously, masterbatches can contain much larger amounts of corrosion inhibitor, e.g. up to 30% by weight (i.e., up to about 45 parts of corrosion inhibitor per 100 parts by weight of elastomer).

At these levels of corrosion inhibitor, some properties of the elastomer can actually be enhanced, e.g. resistance to attack by fungi. For maximum long term/short term protection, a mixture of amine benzoates is preferred, e.g. a mixture of a mono-nitrobenzoate and a di-nitrobenzoate or a mixture of one or both of these nitrated benzoates with an unsubstituted benzoate.

Benzoic and naphthoic acid/amine complexes (i.e., benzoateor naphthoate-amine salts) are available commercially or can be prepared by the conventional reaction $ArCOOH + NR_3 \rightarrow ArCOO^-HN^+R_3$, wherein ArCOOH is the aromatic carboxylic acid and $NR_3$ is the primary, secondary, or tertiary amine.

As mentioned previously, the corrosion inhibitors of this invention are preferebly amine salts or amine-acid complexes which are essentially amphoteric and effective against various types of corrosive attack. In addition to the preferred amineacid complexes (i.e., the aromatic carboxylates), good corrosion inhibition properties can be obtained with amphoteric 2-ethyl hexonoates and chromates made by the interaction or 2-ethyl-hexanoic acid or chromic acid with $NR^1R^2R^3$, where $R^1$, $R^2$, and $R^3$ are as previously defined. When the acid is nitrous acid (resulting in the formation of organic ammonium nitrites), adequate corrosion inhibition can be obtained, but the elastomeric matrix should be a relatively inert material such as polychloroprene.

ELASTOMERS SUITABLE FOR COMBINATION WITH THE CORROSION INHIBITORS

There does not appear to be any limit on the type of elastomer which can be used to make corrosion-inhibiting elastomers of this invention. However, all elastomers do not work with equal effectiveness, and the following elastomers are preferred: natural rubber, polychloroprene, ethylene-propylene rubber, nitrile rubber, (e.g. Buna-N rubbers), butadine-styrene rubber, butyl rubber, silicone rubbers, and other rubbers conventionally used in milling process, including the whole range of Shore hardnesses used in such processes.

The corrosion inhibitors selected according to this invention can be used in lieu of or in addition to conventional rubber additives such as zinc oxide, higher carboxylic acids (e.g. stearic acid), accelerators, anto-oxidants, carbon black, extender oils, plasticizers, and other conventional fillers, extenders, and modifiers (including curing systems, crosslinkers, and the like). For example, a typical shaft seal formula is as follows:

| Ingredient | Parts By Weight |
|---|---|
| Elastomer | 100.0 |
| Zinc Oxide | 5.0 |
| Stearic Acid | 1.0 |
| Accelerators (e.g. TMTD, etc.) | 4.0 |
| Anti-oxidant | 1.0 |
| Carbon Black | 40.0 |
| Other fillers | 60.0 |
| Corrosion inhibitor | 10.0 |

In the following non-limiting Examples, all parts and percentages are by weight unless otherwise indicated.

EXAMPLE I

CORROSION INHIBITING ELASTOMERIC ETHYLENE-PROPYLENE TERPOLYMER

In this series of Examples (Examples I-1 through I-15), the inhibitiors used were CHMI 3,5-dinitrobenzoate (i.e., cyclohexamethylenimine 3,5-dinotrobenzoate), and CHMI benzoate (cyclohexamethylenimine benzoate). The ethylene-propylene terpolymer (EPT) rubber was "NORDELL 1440" (trade designation of E.I. DuPont De Nemours & Co.).

A Control sample was made from an accelerator system, the EPT rubber, and a number of fillers, plasticizers, activators, and modifiers in accordance with the following formula:

THE CORROSION INHIBITOR

The corrosion inhibitors of this invention can be described as amine salts or amine-acid complexes which typically have the ability to inhibit both anodic and cathodic attack upon metals.

The maximum spectrum of corrosion-inhibiting effect, maximum compatibility with elastomers, and maximum long term stability are obtained with aromatic carboxylates (e.g. benzoates) of primary, secondary, or tertiary amines, i.e., amine-acid complexes of aromatic carboxylic acids. The optimum choice for the amine portion of the carboxylate presently appears to be heterocycloaliphatic amines such as cyclohexamethyleneimine (hereinafter referred to as CHMI), piperadine, morpholine (which is less preferable), and the like. The preferred carboxylic acid portion of the carboxylate presently appears to be benzoic acid, mononitrobenzoic acid, dinitrobenzoic acid, and mixtures of these acids. The meta isomers of the nitrated benzoic acids are preferred over the ortho isomers, although both classes of isomers are operative in the invention.

Thus, a typical aromatic carboxylate corrosion inhibitor of this invention has the following formula:

$$ArCOOHNR^1R^2R^3,$$

wherein Ar represents an aromatic moiety;
$R^1$ and $R^2$ represent hydrogen or an aliphatic, cycloaliphatic, or heterocyclic radical;
$R^3$ represents an aliphatic, cycloaliphatic or heterocyclic radical; and
$R^3$ taken together with $R^1$ or $R^2$ and the nitrogen atom represents a heterocyclo-aliphatic secondary or tertiary amino group.

Of the common aliphatic radicals, alkyl groups are preferred. Hydroxyalkyl radicals (as in the case of monoethanol and diethanol amine) are also suitable. Although alkyl-substituted primary, secondary, and tertiary amines are available with alkyl groups having 20 carbon atoms or more, the lower alkyl amines (e.g. up to amyl) are more easily obtained and perform as well or better than the higher alkyl amines.

There is a considerable amount of data indicating that monocyclohexyl and dicyclohexyl amines have, in themselves and in chemical combination with benzoic acids, good corrosion inhibiting properties.

The aromatic moiety is preferably free of substituents which could be a source of oxidizing agents. Thus, for example, it is preferred not to substitute chlorine-containing or sulfurcontaining substituents on the rings or side chains of the aromatic moiety. On the other hand, there is essentially no limit on the hydrocarbyl (aliphatic, cycloaliphatic, aromatic, etc.) substituents which can form a part of the aromatic moiety. Surprisingly, a decrease in volatility caused by the substitution of high molecular weight substituents does not render the corrosion inhibitor inoperative. For example, even if the corrosion inhibitor were essentially non-volatile or had a room temperature vapor pressure of $10^{-8}$ mm of mercury or less, the inhibitor can still provide contact inhibition effects. For example, the 3,5-dinitrobenzoate of cyclohexamethyleneimine (CHMI), despite its very low room temperature vapor pressure (only $< 10^{-6}$ mm of Hg) has both contact effects and a slight vapor phase inhibition effect. It is believed that gaseous contaminants or degradation products released by the elastomer serve as carrier gases for this particular benzoate salt.

The performance of amines and carboxylic acids combined to provide the aromatic carboxylates preferred for use in this invention have been tested and reported on separately in the literature. Good results have been obtained with benzoic acid, toluic acid, isopropylbenzoic acid, and even salicylic acid. (Hydroxysubstituted aromatic nuclei or moieties are not ordinarily preferred in this invention, however.) Good results have also been obtained with naphthoates.

A variety of amines have been impregnated into kraft paper at a concentration of two grams per square foot and tested for inhibition of rusting. The following amines protected more than 25% of the ferrous metal surface against rust: $C_2$-$C_6$ primary alkyl amines (including branched chain alkyl amines such as isopropylamine, isoamylamine, and the like), secondary amines such as diethylamine, diisopropylamine, and dibutylamine; and cycloaliphatic amines, e.g. dicyclohexylamine. Adequate results have been obtained with tertiary amines such as tripropylamine.

Similar tests have been performed with benzoates (i.e., benzoic acid-amine complexes). The objective of the tests was to determine the extent of inhibition of rusting of steel when the steel was protected with kraft paper impregnated with two grams per square foot of the amine-acid complex. A variety of amine-acid complexes were tested in addition to the benzoates. The benzoates which gave the best performance in the test (more than 50% of the surface protected) were:

amyl ammonium benzoate
dibutyl ammonium benzoate
isopropyl ammonium benzoate
diisopropyl ammonium benzoate
cyclohexyl ammonium benzoate dicyclohexyl ammonium benzoate
monoethanol ammonium benzoate
diethanol ammonium benzoate isopropyl ammonium p-isopropyl benzoate
cyclohexyl ammonium p-isopropyl benzoate
ethylmorpholine benzoate
2-naphthyl ammonium benzoate
diisopropyl ammonium 2-naphthoate.

Some of these corrosion inhibitors have very low vapor pressures and yet are operative in this invention through some sort of vapor phase effects. For this reason, it is preferred not to use relatively more volatile corrosion inhibitors except for temporary, short-term protection.

Some representative vapor pressures are as follows:

| Compound | Temperature, °C. | Vapor Pressure, mm Hg |
|---|---|---|
| Cyclohexyl ammonium benzoate | 16.5 | 0.000041 |
| | 19.3 | 0.000064 |
| | 20.8 | 0.000076 |
| | 22.7 | 0.000104 |
| | 24.6 | 0.000132 |
| Ethyl ammonium benzoate | 20 | 0.00055 |
| | 25 | 0.0007 |
| | 30 | 0.00125 |
| | 35 | 0.002 |
| | 40 | 0.0035 |
| Diethyl ammonium benzoate | 30 | 0.0004 |
| Heptyl ammonium benzoate | 35 | 0.00038 |
| Dicyclohexyl ammonium benzoate | 55 | 0.00017 |
| n-butyl ammonium mi-nitrobenzoate | 55 | 0.0001 |
| Diethyl ammonium m-nitrobenzoate | 60 | 0.00015 |

| | Parts By Weight |
|---|---|
| "NORDEL" 1440 (EPT rubber) | 100.0 |
| Zinc Stearate | 0.9 |
| Zinc Oxide | 4.5 |
| Wax | 1.8 |
| Calcium carbonate (filler-reinforcer) | 30.0 |
| Talc | 90.0 |
| Carbon black | 7.5 |
| Dioctylphthalate | 15.0 |
| Process Oil | 15.0 |
| Accelerator and Vulcanizing System | 4.2 |

The Control sample contained no corrosion inhibitor.

In Examples I-1 through I-15, the elastomer formula was the same as the Control formula, except that at least one inhibitor, in amounts ranging from 0.15 to 4.0 weight-%, was dispersed by milling into the previously compounded elastomer formula.

The amounts of inhibitors used in Examples I-1 through I-15 are given in the following table:

| Example | CHMI 3,5-dinitrobenzoate | CHMI Benzoate |
|---|---|---|
| I-1 | 0.75 | 0.00 |
| I-2 | 1.00 | 0.00 |
| I-3 | 1.5 | 0.00 |
| I-4 | 2.00 | 0.00 |
| I-5 | 3.5 | 0.00 |
| I-6 | 4.00 | 0.00 |
| I-7 | 5.00 | 0.00 |
| I-8 | 2.5 | 0.15 |
| I-9 | 2.5 | 0.40 |
| I-10 | 2.5 | 0.80 |
| I-11 | 2.5 | 1.5 |
| I-12 | 4.0 | 0.15 |
| I-13 | 4.0 | 0.4 |
| I-14 | 4.0 | 0.8 |
| I-15 | 4.00 | 1.50 |

Examples I-1 through I-15 were tested for mechanical properties, e.g. tensile strength and Shore A hardness. Measurements of these properties were found to be within + 10% of the same measurements for the Control.

Sheets of the Control sample and eight selected Examples were used in corrosion inhibition tests; see ASTM designation F64-69. The test samples were each approximately four square inches in surface area. Each individual sample was introduced into a separate jar (each jar having an approximate volumn of 0.5 gallon) with a steel specimen (mild steel sheet 2.5 in. × 1 in. × 1/16 in.). Each jar contained 100 miligrams of water with 3.5 g NaCl for producing the corrosive atmosphere. The rubber sheet was not in direct contact with the steel specimen, so that protection was achieved by means of vapor phase inhibition only. The cyclic evaporation and condensation of moisture in the jars was obtained by keeping them 8 hours per day in a air-circulated oven at 120° F. and, for the rest of the day, cooling them to the room temperature, which was kept constant at 70° F. The duration of the test was 10 days (10 cycles). The steel specimens were finished to a profile of 10-20 μin. rms.

The Examples selected for the tests were as follows: I-1, I-4, I-5, I14 6, I-8, I-11, I-12, and I-15. Corrosion tests results were reported according to ASTM designation F64-69. For convenience, the amouns of CHMI 3,5-dinitrobenzoate and CHMI benzoate are indicated in weight percent after each Example, the 3,5-dinitrobenzoate being listed first.

| Sample | Observations |
|---|---|
| Control (no inhibitor) | Medium spots, 30% surface rusted |
| I-1 (0.5%/0.0%) | Spots, staining, 30% rusted. |
| I-4 (2.00%/0.00%) | Light spots, less than 5% rusted |
| I-5 (3.5%/0.00%) | Four spots, less than 5% rusted |
| I-6 (4%/0.00%) | No rust |
| I-8 (2.5%/0.15%) | Light spots, 5% rusted |
| I-11 (2.5%/1.50%) | No rust |
| I-12 (4.0%/0.15%) | No rust |
| I-15 (4.0%/1.5%) | No rust |

EXAMPLE II

Corrosion-inhibiting Elastomeric Styrene-Butadiene (SBR)

In this series of examples, the same inhibitors were used, i.e., CHMI 3,5-dinitrobenzoate (cyclohexomethylenimine 3,5-dinitrobenzoate), and CHMI benzoate. The styrene-butadiene rubber (SBR) was "Copo 1606", supplied by Copolymer Rubber and Chemical Company. As in Example I, a Control sample was made from the elastomer, the accelerator system, and various fillers, plasticizers, etc. without inhibitor. The inhibitors, as in Example I were dispersed into Examples II-1 through II-15 by milling into the previously compounded SBR rubber the various concentrations of the salts or CHMI.

The Control sample was made up according to the following formula:

| | Parts By Weight |
|---|---|
| "Copo" 1606 (SBR) | 100.00 |
| Polyethylene AC | 1.4 |
| Stearic Acid | 0.5 |
| Zinc Oxide | 3.0 |
| Wax | 2.0 |
| Anti-oxidant | 2.0 |
| Accelerator and Vulcanizing System | 4.0 |

The amount of inhibitors included in Examples II-1 through II-15 are given in the following table:

| Example | CHMI 3,5-Dinitrobenzoate | CHMI Benzoate |
|---|---|---|
| II-1 | 0.75 | 0.00 |
| II-2 | 1.00 | 0.00 |
| II-3 | 1.5 | 0.00 |
| II-4 | 2.00 | 0.00 |
| II-5 | 3.5 | 0.00 |
| II-6 | 4.00 | 0.00 |
| II-7 | 5.00 | 0.00 |
| II-8 | 2.50 | 0.15 |
| II-9 | 2.50 | 0.40 |
| II-10 | 2.50 | 0.80 |
| II-11 | 2.5 | 1.50 |
| II-12 | 4.0 | 0.15 |
| II-13 | 4.0 | 0.40 |
| II-14 | 4.0 | 0.80 |
| II-15 | 4.0 | 1.50 |

Examples II-1 through II-15 were tested for mechanical strength properties and found to be within ± 10% of the properties for the Control (which contained no inhibitor). For example, the Shore A hardness for all of the samples including the Control was 65 ± 7.

Corrosion inhibition tests were carried out as in Example I. The samples of the invention selected for the tests were II-1, II-4, II-5, II-6, II-8, II-11, II-12, and II-15. Results were reported according to ASTM designation F64-69. Amounts of inhibitor are indicated in parenthesis, as in Example I.

| Sample | Observations |
| --- | --- |
| Control (no inhibitor) | Heavy spots, 75% surface rusted |
| II-1 (0.75%/0.00%) | Five spots, 5% of surface rusted |
| II-4 (2%/0.00%) | One medium spot, 3% rusted |
| II-5 (3.50%/0%) | Three spots, less than 3% rusted |
| II-6 (4%/0%) | Three medium spots, 3% rusted |
| II-8 (2.5%/0.15%) | Three spots, 3% rusted |
| II-11 (2.5%/1.5%) | No rust |
| II-12 (4.0%/0.15%) | No rust |
| II-15 (4.0%/1.5%) | No rust |

What is claimed is:

1. A solid, corrosion-inhibiting elastomer containing a non-cellular or intercellular elastomeric matrix, said elastomeric matrix containing a corrosion-inhibiting amount of the corrosion-inhibiting compound cyclohexamethyleneimine dinitrobenzoate distributed through said elastomeric matrix.

2. A solid elastomer according to claim 1 in which at least a second corrosion-inhibiting compound other than cyclohexamethyleneimine dinitrobenzoate is distributed through said elastomeric matrix, said second compound having a vapor pressure at normal ambient temperatures which is less than about $3 \times 10^{-2}$ mm of mercury.

3. A solid elastomer according to claim 2 wherein said second corrosion-inhibiting compound is selected from the group consisting of:
an aromatic carboxylate of a primary, secondary, or tertiary amine; a salt of chromic acid; a salt of nitrous acid; and combinations thereof.

4. A solid elastomer according to claim 3 wherein:
said aromatic carboxylate has the following formula:

wherein Ar represents an aromatic moiety,
$R^1$ and $R^2$ represent hydrogen or an aliphatic, cycloaliphatic, or heterocylic radical,
$R^3$ represents an aliphatic, cycloaliphatic, or heterocyclic radical, and
$R^3$ taken together with $R^1$ or $R^2$ and the nitrogen atom represents a heterocyclo-aliphatic secondary or tertiary amino group;
said salt of chromic acid is an organic ammonium chromate which is the salt of chromic acid and the compound $NR^1R^2R^3$, wherein $R^1$, $R^2$, and $R^3$ are as defined previously; and
said salt of nitrous acid is an organic ammonium nitrite which is the salt of nitrous acid and the compound $NR^1R^2R^3$, wherein $R^1$, $R^2$, and $R^3$ are as defined previously.

5. A solid elastomer according to claim 4 wherein $R^1$ and $R^2$ represent hydrogen or a cycloaliphatic radical and $R^3$ represents a cycloaliphatic radical.

6. A solid elastomer according to claim 3 wherein the aromatic carboxylate is obtained from benzoic acid and monocyclohexyl or dicyclohexyl amine.

7. A solid elastomer according to claim 3 wherein said aromatic carboxylate is selected from the group consisting of a non-nitrated benzoate and a mono-nitrobenzoate of a heterocycloaliphatic amine, and mixtures of said non-nitrated benzoate and mono-nitrobenzoate.

8. A solid elastomer according to claim 7 wherein said heterocyclo-aliphatic amine is cyclohexamethyleneimine.

9. A solid elastomer according to claim 1 wherein said elastomer is non-cellular and said aromatic carboxylate is in the form of a finely divided anhydrous solid phase mechanically dispersed through said elastomer.

10. A solid elastomer according to claim 9 wherein said corrosion inhibiting amount is 0.1-30% by weight.

11. A solid elastomer according to claim 9 wherein said elastomer is a molded elastomeric part for an apparatus containing metal parts and wherein said corrosion inhibiting amount is less than 10% by weight.

12. A solid elastomer according to claim 11 wherein said elastomer is a masterbatch compound containing more than 5% by weight of said inhibitor.

13. A metal substrate coated with a layer of corrosion-inhibiting elastomer, said layer comprising at least two laminae:
a. a first lamina, directly in adherent interfacial contact with said metal substrate, said lamina comprising a non-cellular elastomer having 0.1-30% by weight of cyclohexamethyleneimine dinitrobenzoate dispersed therethrough;
b. a second lamina, in interfacial contact with said first lamina, said second lamina comprising a non-cellular elastomer having an amount exceeding 0.5% by weight of cyclohexamethyleneimine dinitrobenzoate dispersed therethrough, said amount being less than the amount of cyclohexamethyleneimine dinitrobenzoate in said lamina (a).

14. A method for making the corrosion-inhibiting elastomer of claim 1 comprising the steps of:
a. providing about 0.1 to 45 parts by weight of substantially anhydrous cyclohexamethylenimine dinitrobenzoate;
b. dispersing said cyclohexamethyleneimine dinitrobenzoate in said substantially anhydrous form into a non-cellular substantially anhydrous mass of solid elastomer by milling of said substantially anhydrous mass in the presence of said cyclohexamethyleneimine dinitrobenzoate, the amount of said non-cellular substantially anhydrous mass of solid elastomer being no more than 100 parts by weight per amount by weight of said cyclohexamethyleneimine dinitrobenzoate.

15. A corrosion inhibiting composition comprising:
0.15-4 parts by weight of cyclohexamethyleneimine 3,5-dinitrobenzoate and
0.15-4 parts by weight of at least one of the following corrosion inhibiting compounds in combination therewith:
cyclohexamethyleneimine mononitrobenzoate
cyclohexamethyleneimine benzoate.

16. A corrosion inhibiting composition comprising, in combination:
a. cyclohexamethyleneimine 3,5-dinitrobenzoate;
b. at least one additional compound selected from the group consisting of:
an aromatic carboxylate of a primary, secondary, or tertiary amine;
a salt of chromic acid; and
a salt of nitrous acid.

17. A corrosion inhibiting composition according to claim 16 wherein:
said aromatic carboxylate has the following formula:

wherein Ar represents an aromatic moiety,

R$^1$ and R$^2$ represent hydrogen or an aliphatic, cycloaliphatic, or heterocyclic radical, R$^3$ represents an aliphatic, cycloaliphatic, or heterocyclic radical, and R$^3$ taken together with R$^1$ or R$^2$ and the nitrogen atom represents a heterocyclo-aliphatic secondary or tertiary amino group;

said salt of chromic acid is an organic ammonium chromate which is the salt of chromic acid and the compound NR$^1$R$^2$R$^3$, wherein R$^1$, R$^2$, and R$^3$ are as defined previously; and said salt of nitrous acid is an organic ammonium nitrite which is the salt of nitrous acid and the compound NR$^1$R$^2$R$^3$, wherein R$^1$, R$^2$, and R$^3$ are as defined previously.

18. A corrosion-inhibiting composition according to claim 16 wherein 0.1-30% by weight of said composition is distributed through a polymer matrix.

19. A corrosion-inhibiting composition according to claim 16 wherein the amounts of said components (a) and (b) are 0.75-4 parts by weight and 0.15-1.5 parts by weight, respectively.

20. A coated substrate wherein the coating comprises the composition of claim 16.

UNITED STATES PATENT AND TRADEMARK OFFICE
CERTIFICATE OF CORRECTION

PATENT NO. : 4,051,066
DATED : September 27, 1977
INVENTOR(S) : Boris A. Miksic and Donovan P. Stern It is certified that error appears in the above-identified patent and that said Letters Patent are hereby corrected as shown below:

In column 2, line 29, for "inhibitor" read --inhibition--.
In column 6, line 28, for "rubber" read --rubbery--.
In column 6, line 48, for "prepared" read --prepare--.
In column 7, line 33, for "placed" read --places--.
In column 7, line 65, for "surface" read --surfaces--.
In column 9, line 26, for ",ArCOOHNR$^1$R$^2$R$^3$," read
    --ArCOOHNR$^1$R$^2$R$^3$,--.
In column 11, line 21, for "group increases" read --group greatly increases--.
In column 11, line 38, for "through" read --throughout--.
In column 11, line 41, for "and copper alloy." read --and copper or copper alloy.--.
In column 11, line 68, for "benzoateor" read --benzoate- or--.
In column 12, line 2, for "ArCOO-HN+R$_3$" read --ArCOOHNR$_3^{-+}$--.
In column 12, line 31, for "process" read --processes--.
In column 13, line 40, for "+ 10%" read --$\pm$ 10%--.
In column 13, line 63, for "I14 6," read --I-6,--.
In column 14, line 30, for "or" read --of--.
In column 14, line 64, for "the samples" read --the SBR samples--.

Signed and Sealed this

Nineteenth Day of September 1978

[SEAL]

Attest:

RUTH C. MASON
Attesting Officer

DONALD W. BANNER
Commissioner of Patents and Trademarks